United States Patent [19]

Usui

[11] 4,168,638
[45] Sep. 25, 1979

[54] FLUID PRESSURE SUPPLY ARRANGEMENT FOR FLUID OPERATED COUNTERSHAFT POWER TRANSMISSION

[75] Inventor: Keizaburo Usui, Yokohama, Japan

[73] Assignee: Nissan Motor Company, Limited, Yokohama, Japan

[21] Appl. No.: 819,452

[22] Filed: Jul. 27, 1977

[30] Foreign Application Priority Data

Jul. 28, 1976 [JP] Japan .................... 51/90804

[51] Int. Cl.² ............... B60K 41/18; B60K 41/16
[52] U.S. Cl. ............................... 74/863; 74/864; 74/866; 74/869
[58] Field of Search ............. 74/863, 864, 866, 869, 74/861, 867, 844, 865, 867, 868, 843

[56] References Cited
U.S. PATENT DOCUMENTS

| | | |
|---|---|---|
| 2,766,639 | 10/1956 | Rosenberger ............... 74/863 |
| 3,292,448 | 12/1966 | Roskopf ...................... 74/864 |
| 3,683,721 | 8/1972 | Uozumi et al. .............. 74/869 |
| 3,823,621 | 7/1974 | Kubo et al. .................. 74/864 |
| 4,023,443 | 5/1977 | Usui et al. ................... 74/866 |

Primary Examiner—Samuel Scott
Assistant Examiner—Randall L. Green
Attorney, Agent, or Firm—Schwartz, Jeffery, Schwaab, Mack, Blumenthal & Koch

[57] ABSTRACT

A fluid pressure supply arrangement for the hydraulic control system of an automated countershaft power transmission for an automotive vehicle, wherein a fluid pressure is generated by vacuum supplied through a vacuum cut-off valve and is directed to the hydraulic control system through a pressure cut-off valve, each of the vacuum and pressure cut-off valves being closed when the engine is at rest and simultaneously the gearshift control lever for the power transmission is held free from a manipulative force.

8 Claims, 2 Drawing Figures

:::page-header
4,168,638
:::

FLUID PRESSURE SUPPLY ARRANGEMENT FOR FLUID OPERATED COUNTERSHAFT POWER TRANSMISSION

FIELD OF THE INVENTION

The present invention relates to countershaft power transmissions of automotive vehicles and particularly to a fluid pressure supply arrangement for a hydraulic control system of a countershaft type power transmission which is operated by the hydraulic control system arranged with an electric control circuit.

DESCRIPTION OF THE PRIOR ART

Automatic power transmissions which are presently in wide use for automotive vehicles generaly utilize torque converters and two, three or four forward-speed power transmistion mechanisms using planetary or epicyclic gear trains. Torque converters are, however, inherently subject to loss of power transmission efficiency due to slippage between the driving and driven members thereof when the torque converters are in coupled conditions. The loss of the torque transmission efficiency thus invited results in deterioration of the engine fuel economy because the power output originally delivered from an engine can not be fully utilized in driving the vehicle. Furthermore, the planetary gear trains and the associated clutches and brakes in the power transmission mechanism are not only extremely intricate in construction and arrangement and are accordingly extremely expensive to manufacture, assemble and service, but restrict the gear ratios available. For this reason, it is difficult to design a planetary gear transmission mechanism in such a a manner as to provide the vehicle driver with satisfactory feelings in driving the vehicle, especially under deceleration or acceleration conditions of the vehicle.

With a view to providing solutions to these problems inherent in automatic power transmissiions of the type using torque converters and planetary gear trains, countershaft power transmissions of automated versions have been proposed and put to practical use in some modernized automotive vehicles. An automated countershaft power transmission uses gear-position selector and gearshift control cylinders to drive gears on a transmission mainshaft with respect to gears on a countershaft parallel with the mainshaft so that desired gear positions are attained depending upon the combinations of the respective positions of the cylinder pistons, each of which is movable between two or more positions. Each of the gear-position selector and gearshift control cylinders is actuated under the control of a hydraulic control system arranged with solenoid-operated servo valves which are controlled to be selectively open and closed by signals delivered from an electric circuit responsive to various operational variables of the vehicle such as, for example, the vehicle speed, the load on the engine and the gear position selected in the power transmission.

A prime object of the present invention is to provide a fluid pressure supply arrangement for use with the hydraulic control system of an automated countershaft-type power transmission of the above described general nature.

SUMMARY OF THE INVENTION

In accordance with one important aspect of the present invention, there is provided a fluid pressure supply arrangement for a hydraulic control system of a countershaft power transmission for an automotive vehicle having a power plant such as an internal combustion engine and a gearshift control mechanism to effect a gearshift in the power transmission, comprising a source of fluid, a source of vacuum, fluid-pressure delivery means in constant communication with the fluid source and communicable with the hydraulic control system, vacuum conducting means for providing communication between the vacuum source and the fluid-pressure delivery means, a vacuum cut-off valve provided in said vacuum conducting means and having conditions respectively to establish and interrupt the communication between the vacuum source and the fluid-pressure delivery means, and switch means responsive to a condition in which the power plant is in operation or at rest and a condition in which the gearshift control mechanism is free from a manipulative force or being manipulated, the switch means being operative to open the vacuum cut-off valve in response to the condition in which the power plant is in operation or to the conditions in which the power plant is at rest and the gearshift control mechanism is being manipulated and to close the valve in response to the conditions in which the power plant is at rest and the gearshift control mechanism is free from a manipulative force. The fluid pressure supply arrangement may further comprise detecting means responsive to variation in the fluid pressure delivered from the fluid-pressure delivery means and operative to close the vacuum cut-off valve in response to a fluid pressure higher than a predetermined level for thereby causing the fluid-pressure delivery means to interrupt generation of fluid pressure therein when the fluid pressure being delivered therefrom is higher than the predetermined level.

In accordance with another important aspect of the present invention, there is provided a fluid pressure supply arrangement for a hydraulic control system of a countershaft power transmission for an automotive vehicle having a power plant such as an internal combustion engine and a manually operated gearshift control mechanism to effect a gearshift in the power transmission, comprising a source of fluid, a source of vacuum, fluid-pressure delivery means in constant communication with the fluid source and communicable with the vacuum source, fluid conducting means for providing communication between the fluid-pressure delivery means and the hydraulic control system, a pressure cut-off valve provided in the fluid conducting means and having conditions respectively to establish and interrupt the communication between the fluid-pressure delivery means and the hydraulic control system, and switch means responsive to a condition in which the power plant is in operation or at rest and a condition in which the gearshift control mechanism is free from a manipulative force or being manipulated, the switch means being operative to open the pressure cut-off valve in response to the condition in which the power plant is in operation or to the conditions in which the power plant is in operation and the gearshift control mechanism is being manipulated and to close the valve in response to the conditions in which said power plant is at rest and the gearshift control mechanism is free from a manipulative force. The fluid pressure supply arrangement of this nature may further comprise vacuum conducting means for providing communication between the vacuum source and the fluid-pressure delivery means and a vacuum cut-off valve provided in the vacuum conducting means and having conditions respectively to establish and interrupt the communication between the vacuum source and the fluid-pressure delivery means, the switch means being operative to open both of the pressure and vacuum cut-off valves in response to the condition in which the power plant is in operation or to the conditiions in which the power plant is at rest and the gearshift control mechanism is being manipulated and to close the valve in response to the conditions in which the power plant is at rest and the gearshift control mechanism is free from a manipulative force.

DESCRIPTION OF THE DRAWING

The features and advantages of the fluid pressure supply arrangement according to the present invention will be more clearly understood from the following description taken in conjunction with the accompanying drawings in which.

DESCRIPTION OF A PREFERRED EMBODIMENT

Figure 1:
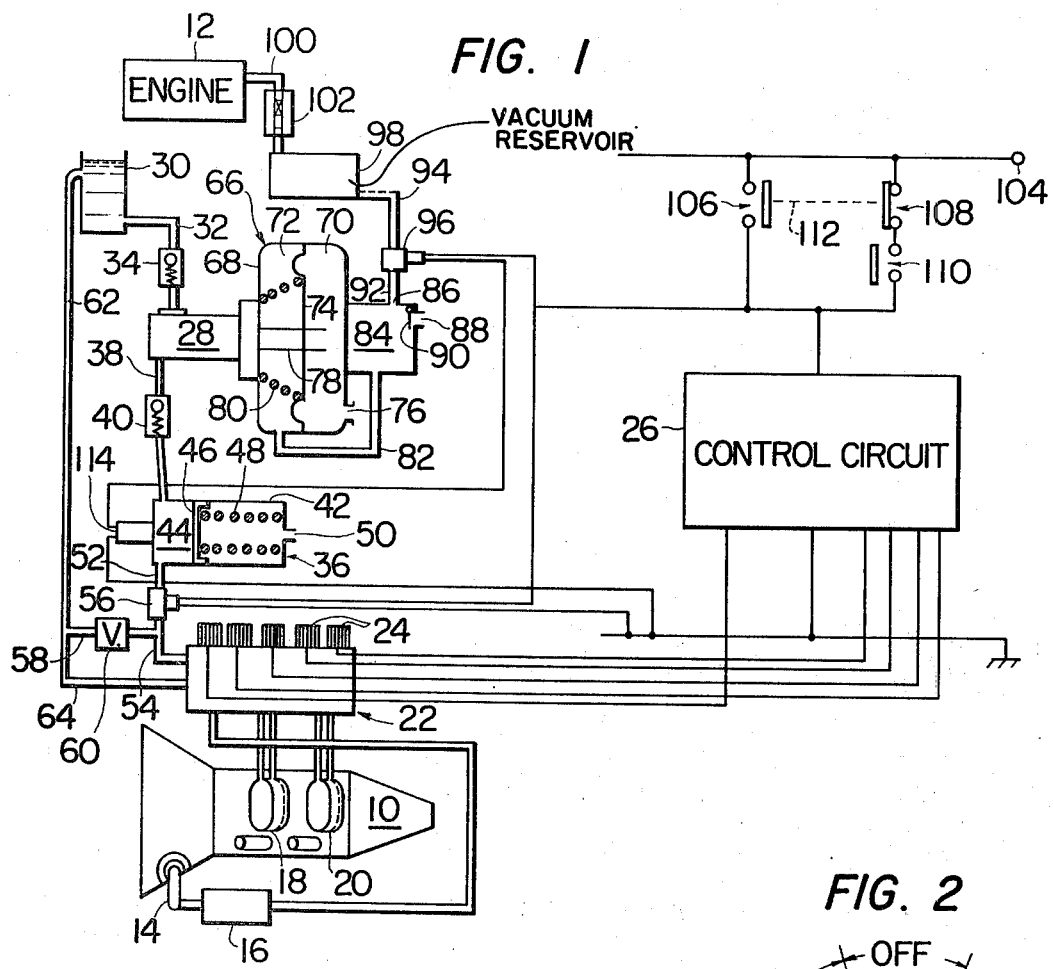
FIG. 1 is a schematic view showing a preferred embodiment of the fluid pressure supply arrangement according to the present invention.

Referring to FIG. 1 of the drawing, a fluid pressure supply arrangement embodying the present invention is for use with a hydraulic control system of a countershaft power transmission which comprises a power transmission mechanism 10 which includes a mechanically operated gear assembly and a mechanically operated clutch assembly, though not shown. As in a manually operated power transmission of the countershaft type, the gear assembly of the power transmission mechanism 10 comprises a main drive gear fixedly mounted on a transmission input shaft, gears and synchronizers axially movable on a transmission mainshaft which is in line with the transmission input shaft, and gears fixedly mounted on a transmission countershaft which is parallel with the transmission mainshaft. The gears on the transmission countershaft include a main driven gear which is in constant mesh with the main drive gear on the transmission input shaft. On the other hand, the clutch assembly forming part of the power transmission mechanism 10 comprises a driven member connected to the transmission input shaft and a driving member connected to the output shaft (not shown) of an internal combustion engine which is simply diagrammatically illustrated at 12. The driven member of the clutch assembly is engaged by a clutch drive linkage 14 which is mechanically connected to the piston (not shown) of a fluid-operated clutch drive cylinder 16.

The power transmission mechanism 10 further includes gear-position selector and gearshift control linkages (not shown) which are mechanically connected to fluid-operated gear-position selector and gearshift control cylinders 18 and 20, respectively. The clutch drive cylinder 16, gear-position selector cylinder 18 and gearshift control cylinder 20 are in communication with a hydraulic control system which is simply diagramatically illustrated at 22. The hydraulic control system 22 includes solenoid-operated servo valves which are commonly designated by reference numeral 24 and which are electrically connected to an electric control circuit 26. The contrl circuit 26 is adapted to be responsive to various operational parameters of an automotive vehicle such as, for example, the vehicle speed, the gear positions selected in the power transmission mechanism 10, and the opening degree of the carburetor throttle valve incorporated in the internal combustion engine 12. The control circuit 26 thus supplies output signals to the servo valves 24 of the hydraulic control system 22 depending upon the operational conditions of the vehicle so that the servo valves 24 are selectively energized and de-energized. The servo valves 24 are thus selectively opened up and closed in response to the signals delivered from the control circuit 26 and actuate the cylinders 16, 18 and 20 to couple or uncouple the clutch assembly or move the gears on the transmission mainshaft into positions producing prescribed gear positions. The piston of each of the gear-position selector cylinder 18 and the gearshift control cylinder 20 is movable between two or more predetermined positions depending upon the fluid pressure or pressures developed in each cylinder so that the gears on the transmission mainshaft are moved into the positions to produce the prescribed gear positions depending upon the combinations of the positions of the respective pistons of the cylinders 18 and 20. The gear-position selector and gearshift control linkages incorporated into the transmission mechanism are operatively connected to a manually operated gearshift control lever (not shown) and can be manually operated to move the gears on the transmission mainshaft into the positions to produce an automatic forward-drive range position or any of the reverse-drive, parking and neutral gear positions.

The fluid pressure supply arrangement embodying the present invention is adapted to supply a substantially constant fluid pressure to the hydraulic control system 22 for the countershaft power transmission mechanism 10 thus constructed and arranged. The fluid pressure supply arrangement comprises a fluid-pressure generating cylinder 28 having a variable-volume working chamber (not shown) which has a fluid inlet port communicating with a suitable fluid source 30 through a fluid supply passgeway 32. The fluid supply passageway 32 is provided with a one-way check valve 34 adapted to prevent fluid from flowing backwardly from the cylinder 28 toward the fluid source 30. The working chamber in the cylinder 28 has a fluid outlet port which is open to a fluid pressure delivery passageway 38 leading to a pressure accumulator 36 through a one-way check valve 40 adapted to prevent pressurized fluid from flowing backwardly from the pressure accumulator 36 toward the cylinder 28. The pressure reservoir 36 is shown comprising a hollow casing 42 having a variable-volume fluid chamber 44 in which the fluid pressure delivery passageway 38 terminates. The fluid chamber 44 in the casing 42 is defined in part by a floating piston 46 which is urged to axially move in a direction to contract the fluid chamber 44 by suitable biasing means such as a preloaded helical compression spring 48 which is seated at one end on the outer face of the piston 46 and at the other on the inner face of an end wall of the casing 42 opposite to the fluid chamber 44, the end wall being formed with a breather port 50.

The fluid chamber 44 in the pressure accumulator 36 thus constructed is open to a fluid passageway 52 which is communicable with a fluid passageway 54 across a solenoid-operated pressure cut-off valve 56 which is adapted to be open when energized and to close when de-energized. The passageway 54 leading from the pressure cut-off valve 56 communicates with the hydraulic control system 22. By preference, a branch passageway 58 having a pressure relief valve 60 may lead from the passageway 54 to a fluid return passageway 62 terminating in the fluid source 30. The pressure relief valve 60 is responsive to the fluid pressue in the passageway 54 and is opened up when the fluid pressure in the passageway 54 happens to rise beyond a predetermined level. The fluid return passageway 62 is also in communication with drain ports (not shown) of the hydraulic control system 22 through a passageway 64.

The fluid pressure supply arrangement embodying the present invention further comprises a vacuum-operated diaphragm assembly 66 having a hollow casing 68 fixedly connected to the fluid-pressure generating cylinder 28. The casing 68 of the diaphragm assembly 66 is internally divided into two variable-volume compartments 70 and 72 by a flexible diaphragm element 74 which is secured along its outer peripheral end to the casing 68. One variable-volume compartment 70 is located opposite to the cylinder 28, with the other variable-volume compartment 72 located in between, and is open to the atmosphere through a breather port 76. The compartment 72 constitutes a variable-volume vacuum chamber and is located adjacent to the cylinder 28. The diaphragm element 74 is thus deformable or partially movable in opposite directions to expand and contract the variable-volume vacuum chamber 72 and is connected to the piston (not shown) of the cylinder 28 by a plunger 78 so that the piston of the cylinder 28 is axially movable with the diaphragm element 74. The diaphragm element 74 is urged to deform or partially move in the direction to expand the variable-volume control chamber 72 and accordingly the piston of the cylinder 28 is urged to axially move in a direction to expand the variable-volume working chamber of the cylinder 28 by suitable biasing means such as a preloaded helical compression spring 80 which is positioned within the vacuum chamber 72 and which is seated at one end on one face of the diaphragm element 74 and at the other end on the inner face of an end wall of the casing 68 mounted on the cylinder 28 as shown.

The variable-volume vacuum chamber 72 thus formed in the diaphragm assembly 66 is in constant communication through a passageway 82 with a valve chamber 84 having a vacuum port 86 and an air port 88 which is open to the atmosphere. Within the valve chamber 84 is positioned a two-position valve element 90 which is arranged to be movable between a first position opening the vacuum port 86 and closing the air port 88 as shown and a second position closing the vacuum port 86 and opening the air port 88. The valve element 90 is connected to the diaphragm element 74 or the plunger 78 of the diaphragm assembly 66 by a suitable mechanical linkage (not shown) and is moved to the first position when the diaphragm element 74 is deformed in the direction to expand the variable-volume vacuum chamber 72 of the diaphragm assembly 66 and to the second position when the diaphragm element 74 is deformed in the opposite direction to contract the variable-volume vacuum chamber 74. The vacuum port 86 is open to a vacuum inlet passageway 92 which is communicable with a vacuum passageway 94 across a solenoid-operated vacuum cut-off valve 96. The vacuum cut-off valve 96 is arranged to be open when energized and to close when de-energized. The vacuum passageway 94 terminating in the vacuum cut-off valve 96 originates in a vacuum reservoir 98 which has a vacuum inlet port (not shown) communicating with a suitable vacuum source (not shown) through a passageway 100 provided with a one-way check valve 102 which is adapted to prevent vacuum from being allowed to extend backwardly from the vacuum reservoir 98 toward the vacuum source. The vacuum source is preferably the intake manifold (not shown) of the engine 12.

When the vacuum cut-off valve 96 is open and simultaneously the two-position valve element 90 provided in the valve chamber 84 is in the previously mentioned first position opening the vacuum port 86 and closing the air port 88 of the valve chamber 84, the vacuum accumulated in the vacuum reservoir 98 is extended by way of the passageway 94, valve 96 and passageway 92 to the valve chamber 84 so that a partial vacuum is developed in the variable-volume vacuum chamber 72 in the diaphragm assembly 66 through the passageway 82. As a consequence, the diaphragm element 74 is forced to deform in the direction to contract the vacuum chamber 72 against the force of the compression spring 80. As the vacuum chamber 72 is thus contracted, the piston of the fluid-pressure generating cylinder 28 is axially moved to contract the variable-volume working chamber of the cylinder 28 with the result that the fluid in the working chamber of the cylinder is compressed. The fluid under pressure is passed through the passageway 38 to the fluid chamber 44 of the pressure accumulator 36. The fluid pressure in the accumulator 36 is directed to the hydraulic system 22 by way of the passageway 52, pressure cut-off valve 56 and passageway 54 of the pressure cut-off valve 56 which is open. When the diaphragm element 74 is deformed or partially moved in the direction to contract the variable-volume vacuum chamber 72 of the diaphragm assembly 66 as above described, the two-position valve 90 in the valve chamber 84 is moved into the second position thereof, closing the vacuum port 86 and opening up the air port 88 of the valve chamber 84. Atmospheric air is consequently drawn into the valve chamber 84 through the air port 88 and accordingly into the variable-volume vacuum chamber 72 of the diaphragm assembly 66 through the passageway 82 so that the vacuum in the vacuum chamber 72 is eliminated or moderated and allows the diaphragm element 74 to deform or partially move in the direction to expand the vacuum chamber 72 by the force of the compression spring 80. This causes the two-position valve 90 in the valve chamber 84 to move back into the first position thereof and for a second time develops a vacuum in the variable-volume vacuum chamber 72 of the diaphragm assembly 66. The two-position valve element 90 is thus repeatedly moved between the first and second positions thereof and as a consequence the diaphragm element 74 is repeatedly deformed or partially moved in the opposite directions to expand and contract the variable-volume vacuum chamber 72 of the diaphragm assembly 66 so that the fluid pressure developed in the working chamber of the fluid-pressure generating cylinder 28 is maintained at a substantially constant level.

Figure 2:
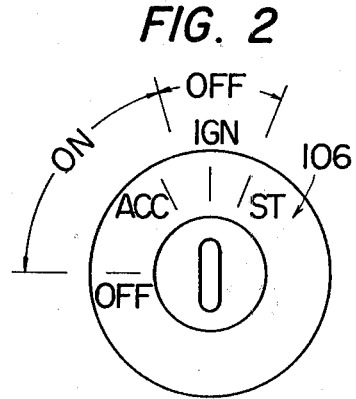
FIG. 2 is a front view of a switch forming part of the embodiment illustrated in FIG. 1.

The solenoid-operated pressure cut-off valve 56 and the solenoid-operated vacuum cut-off valve 96 have respective solenoid coils (not shown) which are electrically connected in parallel to the positive terminal 104 of a d.c. power source across a first switch 106 and a serries combination of second and third switches 108 and 110 which are parallel with the first switch 106. The first switch 106 is associated with the engine 12 and is adapted to be open when the engine 12 is at rest and to close when the engine 12 is in operation. The first switch 106 may thus be constituted by the usual ignition switch of the ignition system of the engine as shown in FIG. 2. The second switch 108 is ganged with the first switch 106 by means of a suitable mechanical linkage 112 indicated by a broken line and is arranged to close and open when the first switch 106 is open and closed, respectively. The third switch 110 is associated with the manually-operated gearshift control lever (not shown) of the power transmission system and is arranged to be open when the control gearshift lever is kept untouched by the vehicle driver and to close when the gearshift control lever is being manipulated by the vehicle driver. Between the solenoid coil of the vacuum cut-off valve 96 and the d.c. power source is further provided a fourth switch 114 which is associated with the fluid pressure accumulator 36 for being responsive to the fluid pressure in the fluid chamber 44 of the pressure accumulator 36 and which is arranged to open when the fluid pressure in the chamber 44 of the accumulator 36 is higher than a predetermined level. The vacuum cut-off valve 96 is thus energized and open when the fluid pressure developed in the fluid chamber 44 is lower than the predetermined level under the condition in which the first switch 106 is closed with the engine in operation or under the conditions in which the first switch 106 is open and accordingly the second switch 108 is closed with the engine at rest and the third switch 110 is closed with the gearshift control lever being manipulated by the vehicle driver. On the other hand, the pressure cut-off valve 56 is energized and open irrespective of the fluid pressure in the pressure accumulator 36 if the engine is in operation or if the engine is at rest but the gearshift control lever is being manipulated.

When, thus, the engine 12 is in operation or when the engine 12 is at rest but the gearshift control lever of the power transmission is being manipulated by the vehicle driver, the pressure cut-off valve 56 is energized from the positive terminal 104 of the d.c. power source either through the first switch 106 or through the series combination of the second and third switches 108 and 110 and establishes communication between the fluid passageway 52 leading from the pressure accumulator 36 and the fluid passageway 54 leading to the hydraulic control system 22. The fluid pressure developed in the fluid-pressure generating cylinder 28 and stored in the pressure accumulator 36 is directed to the hydraulic control system 22 by way of the fluid passageway 52, fluid cut-off valve 56 and fluid passageway 54 so that the hydraulic control system 22 is in a condition operable to actuate the clutch drive cylinder 16, gear-position selector cylinder 18 and gearshift control cylinder 20 under the control of the signals fed to the servo valves 24 from the control circuit 26. If, under these conditions, the fluid pressure in the fluid chamber 44 of the pressure accumulator 36 is lower than the predetermined level, the fourth switch 114 is kept closed so that the solenoid-operated vacuum cut-off valve 96 is also energized from the positive terminal 104 of the d.c. power source either through the first switch 106 or through the series combination of the second and third switches 108 and 110 and is thus kept open, establishing communication between the passageways 92 and 94 through the valve 96. By means of the vacuum accumulated in the vacuum reservoir 98, a vacuum is developed repeatedly in the valve chamber 84 and accordingly in the variable-volume vacuum chamber 72 of the diaphragm assembly 66 by the motions of the two-position valve element 90 between the first and second positions thereof and maintains substantially constant the fluid pressure developed in the fluid-pressure generating cylinder 28, as previously described. If, however, the fluid pressure in the pressure accumulator 36 is increased beyond the predetermined level, the fourth switch 114 is opened up and causes the solenoid-operated vacuum cut-off valve 96 to be electrically disconnected from the d.c. power source and to close, thereby blocking the communication between the passageways 92 and 94 across the valve 96. The valve chamber 84 and accordingly the variable-volume vacuum chamber 72 of the diaphragm assembly 66 are therefore isolated from the vacuum reservoir 98 so that the pressure in the vacuum chamber 72 is maintained at an atmospheric level. The diaphragm element 74 is accordingly held in the position causing the variable-volume chamber 72 to assume a maximum internal volume by the force of the compression spring 80 so that the fluid-pressure generating cylinder 28 interrupts development of fluid pressure in the working chamber thereof until the fluid pressure in the pressure accumulator 36 is reduced to the predetermined level.

When, on the other hand, the first switch 106 is open with the engine 12 at rest and simultaneously the third switch 110 is open with the transmission gearshift control level kept untouched and held in, for example, the parking position, both of the solenoid-operated pressure and vacuum cut-off valves 56 and 96 are electrically disconnected from the d.c. power source and are therefore held closed. Under these conditions, the fluid pressure accumulator 36 is isolated from the hydraulic control system 22 by the pressure cut-off valve 56 and at the same time the vacuum reservoir 98 is isolated from the valve chamber 84 by the vacuum cut-off valve 96. If the transmission gearshift control lever is manipulated to shift the transmission gear position to the first forward drive gear position or to the reverse-drive gear position from these conditions, the pressure and vacuum cut-off valves 56 and 96 are actuated to open concurrently so that fluid pressure is readily developed in the fluid-pressure generating cylinder 28 and is directed to the hydraulic control system 22 so as to initiate any of the cylinders 14, 16 and 18 into motion to effect such a gearshift. When the engine is at rest, the vacuum necessary to effect the foregoing operation is provided by vacuum stored in the vacuum reservoir 98. Since the vacuum cut-off valve 96 will be opened only during the relatively short period of time during which the shift lever is being manipulated by the driver, the vacuum stored in vacuum reservoir 98 will normally not be depleted by any single movement of the shift lever.

Provision of the pressure cut-off valve 56 is conducive to prevention of fluid pressure from being discharged from the pressure accumulator when the engine is at rest and to enabling the power transmission to make a shift to the first or "low" forward-drive gear ratio or reverse-drive gear position when the engine is at rest.

What is claimed is:

1. A fluid pressure supply arrangement for a hydraulic control system of a countershaft power transmission for an automotive vehicle having a power plant and a gearshift control mechanism to effect a gearshift in the power transmission, comprising a source of fluid; a source of vacuum; fluid-pressure delivery means in communication with the fluid source and communicable with said hydraulic control system; vacuum conducting means for providing communication between said vacuum source and said fluid-pressure delivery means; a vacuum cut-off valve provided in said vacuum conducting means and having conditions respectively to establish and interrupt said communication between said vacuum source and said fluid-pressure delivery means; and switch means responsive to a condition in which said power plant is in operation or said power plant is at rest and a condition in which said gearshift control mechanism is free from a manipulative force or being manipulated, for opening said vacuum cut-off valve to establish said communication in response to the condition in which said power plant is in operation or to the conditions in which said power plant is at rest and said gearshift control mechanism is being manipulated and for closing the valve to interrupt said communication in response to the conditions in which said power plant is at rest and said gearshift control mechanism is free from a manipulative force.

2. A fluid pressure supply arrangement as set forth in claim 1, further comprising detecting means, responsive to variation in the fluid pressure delivered from said fluid-pressure delivery means, for closing said vacuum cut-off valve in response to a fluid pressure higher than a predetermined level to cause said fluid-pressure delivery means to interrupt generation of fluid pressure therein when the fluid pressure being delivered therefrom is higher than said predetermined level.

3. A fluid pressure supply arrangement for a hydraulic control system of a countershaft power transmission for an automotive vehicle having a power plant and a gearshift control mechanism to effect a gearshift in the power transmission, comprising a source of fluid; fluid-pressure delivery means in communication with the fluid source; fluid conducting means for providing communication between said fluid-pressure delivery means and said hydraulic control system; a pressure cut-off valve provided in said fluid conducting means and having conditions respectively to establish and interrupt said communication between the fluid-pressure delivery means and said hydraulic control system; and switch means, responsive to a condition in whcih said power plant is in operation or said power plant is at rest and said gearshift control mechanism is free from a manipulative force or being manipulated, for opening said pressure cut-off valve in response to the condition in which said power plant is in operation or to the condition in which said power plant is in operation and said gearshift control mechanism is being manipulated and for closing the valve in response to the conditions in which said power plant is at rest and said gearshift control mechanism is free from a manipulative force.

4. A fluid pressure supply arrangement as set forth in claim 3, further comprising a source of vacuum communicable with said fluid-pressure delivery means, vacuum conducting means for providing communication between said vacuum source and said fluid-pressure delivery means and a vacuum cut-off valve provided in said vacuum conducting means and having conditions respectively to establish and interrupt said communication between said vacuum source and said fluid-pressure delivery means, said switch means being operative to open both of the pressure and vacuum cut-off valves in response to the condition in which said power plant is in operation or to the conditions in which said power plant is at rest and said gearshift control mechanism is being manipulated and to close the valves in response to the conditions in which said power plant is at rest and said gearshift control mechanism is free from a manipulative force.

5. A fluid pressure supply arrangement as set forth in claim 4, further comprising detecting means, responsive to variation in the fluid pressure delivered from said fluid-pressure delivery means for closing said vacuum cut-off valve in response to a fluid pressure higher than a predetermined level to cause said fluid-pressure delivery means to interrupt generation of fluid pressure therein when the fluid pressure being delivered therefrom is higher than said predetermined level.

6. A fluid pressure supply arrangement as set forth in claim 5, in which said fluid-pressure delivery means comprises a fluid-pressure generating cylinder having a working chamber in communication with said fluid source and communicable with said hydraulic control system through said fluid conducting means and a piston movable in said working chamber; a diaphragm assembly including a flexible diaphragm element defining part of a variable-volume chamber and deformable in opposite directions to contract and expand the variable-volume chamber, said diaphragm element being connected to said piston for moving the piston in opposite directiions in said working chamber and pressurizing the fluid in the working chamber when said diaphragm element is deformed in one of the opposite directions; a valve chamber in communication with said variable-volume chamber and having a vacuum port communicating with said vacuum conducting means anterior to said vacuum cut-off valve in the direction in which the vacuum is to extend in the vacuum conducting means and an air port open to the atmosphere; and a two-position valve element positioned within said valve chamber and movable between a first position opening said vacuum port and closing said air port and a second position closing the vacuum port and opening the air port, the valve element being movable with said diaphragm for being moved into the first and second positions thereof when the diaphragm element is deformed in the directions to expand and contract, respectively, said variable-volume chamber.

7. A fluid pressure supply arrangement as set forth in claim 6, in which each of said pressure and vacuum cut-off valves is of an electrically operated type to open and close when energized and de-energized, respectively, and in which said switch means comprises a first switch to be open when said power plant is at rest and to close when the power plant is in operation, a second switch mechanically connected to said first switch and arranged to open and close when the first switch is closed and open, respectively, and a third switch to be open when said gearshift control mechanism is free from manipulative force and to close when the gearshift control mechanism is being manipulated, said pressure and vacuum cut-off valves being connected in parallel to an electric power source across said first switch and across a series combination of the second and third switches which are in parallel with said first switch.

8. A fluid pressure supply arrangement as set forth in claim 7, in which said detecting means comprises a switch which is open when the fluid pressure in said fluid-pressure delivery means is lower than said predetermined level and which is connected between said vacuum cut-off valve and said power source.

* * * * *